United States Patent
Shum et al.

(10) Patent No.: US 7,953,932 B2
(45) Date of Patent: May 31, 2011

(54) SYSTEM AND METHOD FOR AVOIDING DEADLOCKS WHEN PERFORMING STORAGE UPDATES IN A MULTI-PROCESSOR ENVIRONMENT

(75) Inventors: Chung-Lung Kevin Shum, Wappingers Falls, NY (US); Brian D. Barrick, Pflugerville, TX (US); Aaron Tsai, Poughkeepsie, NY (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 12/030,627

(22) Filed: Feb. 13, 2008

(65) Prior Publication Data

US 2009/0204763 A1 Aug. 13, 2009

(51) Int. Cl.
*G06F 12/00* (2006.01)
(52) U.S. Cl. .................................... 711/124; 711/122
(58) Field of Classification Search .................. 711/124, 711/122

See application file for complete search history.

(56) References Cited

U.S. PATENT DOCUMENTS

| | | | |
|---|---|---|---|
| 4,891,749 A | 1/1990 | Hoffman et al. | |
| 5,006,980 A | 4/1991 | Sanders et al. | |
| 5,442,763 A | 8/1995 | Bartfai et al. | |
| 5,572,704 A | 11/1996 | Bratt et al. | |
| 6,134,635 A | 10/2000 | Reams | |
| 6,389,515 B1 | 5/2002 | Schibinger et al. | |
| 6,427,193 B1 | 7/2002 | Hughes et al. | |
| 6,671,793 B1 | 12/2003 | Swaney et al. | |
| 7,437,539 B2 * | 10/2008 | Abernathy et al. | 712/219 |
| 2002/0083149 A1 * | 6/2002 | Van Huben et al. | 709/215 |
| 2004/0098723 A1 * | 5/2004 | Radovic et al. | 718/104 |
| 2004/0193844 A1 | 9/2004 | Thimmannagari et al. | |

OTHER PUBLICATIONS

"IBM® z/Architecture Principles of Operation", Publication No. SA22-7832-05, 6th Edition, Apr. 2007. 1,215 pages separated into 4 electronic attachments.

* cited by examiner

*Primary Examiner* — Hashem Farrokh
(74) *Attorney, Agent, or Firm* — Cantor Colburn LLP; John Campbell

(57) ABSTRACT

A system and method for avoiding deadlocks when performing storage updates in a multi-processor environment. The system includes a processor having a local cache, a store queue having a temporary buffer with capability to reject exclusive cross-interrogates (XI) while an interrogated cache line is owned exclusive and is to be stored, and a mechanism for performing a method. The method includes setting the processor into a slow mode. A current instruction that includes a data store having one or more target lines is received. The current instruction is executed, with the executing including storing results associated with the data store into the temporary buffer. The store queue is prevented from rejecting an exclusive XI corresponding to the target lines of the current instruction. Each target line is acquired with a status of exclusive ownership, and the contents from the temporary buffer are written to each target line after instruction completion.

20 Claims, 5 Drawing Sheets

SYSTEM AND METHOD FOR AVOIDING DEADLOCKS WHEN PERFORMING STORAGE UPDATES IN A MULTI-PROCESSOR ENVIRONMENT

BACKGROUND OF THE INVENTION

This invention relates generally to multi-processor environments, and more particularly to avoiding deadlocks when performing storage updates in a multi-processor environment.

In a multiprocessing system where a consistent memory usage model is required, memory usage among different processors is managed using cache coherency ownership schemes. These schemes usually involve various ownership states for a cache line. These states include read-only (or commonly known as shared), and exclusive (where a certain processor has the sole and explicit update rights to the cache line, sometimes known as store access).

For one such protocol used for a strongly-ordered memory consistency model, as in IBM's z/Architecture implemented by IBM System z processors, when a processor is requesting rights to update a line, e.g. when it is executing a "Store" instruction, it will check its local cache (L1) for the line's ownership state. If the processor finds out that the line is either currently shared or is not in its cache at all, it will then send an "exclusive ownership request" to the storage controller (SC) which serves as a central coherency manager.

The storage controller (SC) tracks which processor, if any, currently owns a line exclusively. If deemed necessary SC will then send a specific "cross interrogate" (XI) or "ownership change" request to another processor which currently owns that line to release its exclusive rights. This XI is usually called an "exclusive XI". Once the current owning processor has responded to the XI and responded that the exclusive ownership is released, the requesting processor will then be given exclusive update rights to the line requested.

It is also possible that the SC finds one or more processors currently have the requested line in a read-only (or shared) state. The SC will have to inform those processors through its XI interface, in this case indicating to those processors that the line is about to be changed. These processors' local cache logic will then make sure the data which currently exists in their caches cannot be consumed anymore.

In a large Symmetric Multi-Processing (SMP) system, it is common that various processes running on different processors, or different threads within a processor, update or use the same cache lines, at similar times. When a process running on one processor references or updates a line that is currently owned exclusively by another processor, the owning processor must acknowledge the XI and relinquish exclusive ownership before the first processor can access that line.

In some implementations a processor may in some cases reject an exclusive XI request and retain exclusive access to that line, in which case the storage controller will reprioritize its pending requesters and resend the exclusive XI at a later time. In this case, it is important that the owning processor does not retain exclusive access to that line indefinitely if it at the same time is also requesting a line from the storage controller in order to complete its current instruction, otherwise a deadlock may result.

BRIEF SUMMARY OF THE INVENTION

An exemplary embodiment includes a processor in a multi-processor shared data environment having a cache memory structure involving various ownership states as to a cache line. The state includes a read-only or shared state and an exclusive state for holding the line exclusively. The processor includes a local cache adapted for communication with one or more shared higher level caches for sourcing cache lines, a store queue having a temporary buffer with capability to reject exclusive cross-interrogates (XI) while an interrogated cache line is owned exclusive and is to be stored, and a mechanism for performing a method. The method includes setting the processor into a slow mode to fetch, decode and execute a single instruction at a time. A current instruction that includes a data store having one or more target lines is received. The current instruction is executed, with the executing including storing results associated with the data store into the temporary buffer. The store queue is prevented from rejecting an exclusive XI corresponding to the target lines of the current instruction. Each of the target lines is acquired with a status of exclusive ownership, and the contents from the temporary buffer are written to each target line after instruction completion.

Another exemplary embodiment includes a method for avoiding deadlocks when performing storage updates in a multi-processor environment. The method includes setting the processor into a slow mode to fetch, decode and execute a single instruction at a time. A current instruction that includes a data store having one or more target lines is received. The current instruction is executed, with the executing including storing results associated with the data store into a temporary buffer. The store queue is prevented from rejecting an exclusive XI corresponding to the target lines of the current instruction. Each of the target lines is acquired with a status of exclusive ownership and contents from the temporary buffer are written to each target line after instruction completion.

A further exemplary embodiment includes a processor in a multi-processor, shared data environment. The processor includes a local cache adapted for communication with one or more shared higher level caches for sourcing cache lines, and a mechanism for performing a method. The method includes receiving an instruction that includes a data store. The processor is set to a fast mode where multiple instructions are executed in parallel and a target cache line associated with the data store is acquired from the local cache with a status of exclusive ownership prior to execution of the instruction. Execution of the instruction is initiated in the fast mode. In response to detecting a possible deadlock during the execution in fast mode: execution of the instruction in the fast mode is aborted; the processor is set to a slow mode where a single instruction at a time is executed and the target cache line is acquired from the local cache with a status of exclusive ownership prior to execution of the instruction; and execution of the instruction is initiated in the slow mode. In response to detecting a possible deadlock during the execution in slow mode: execution of the instruction in the slow mode is aborted; the processor is set to an enhanced slow mode where a single instruction at a time is executed and the target cache line is acquired from the local cache with a status of read only prior to execution of the instruction and in a status of exclusive ownership after execution of the instruction has completed; and execution of the instruction is initiated in the enhanced slow mode.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
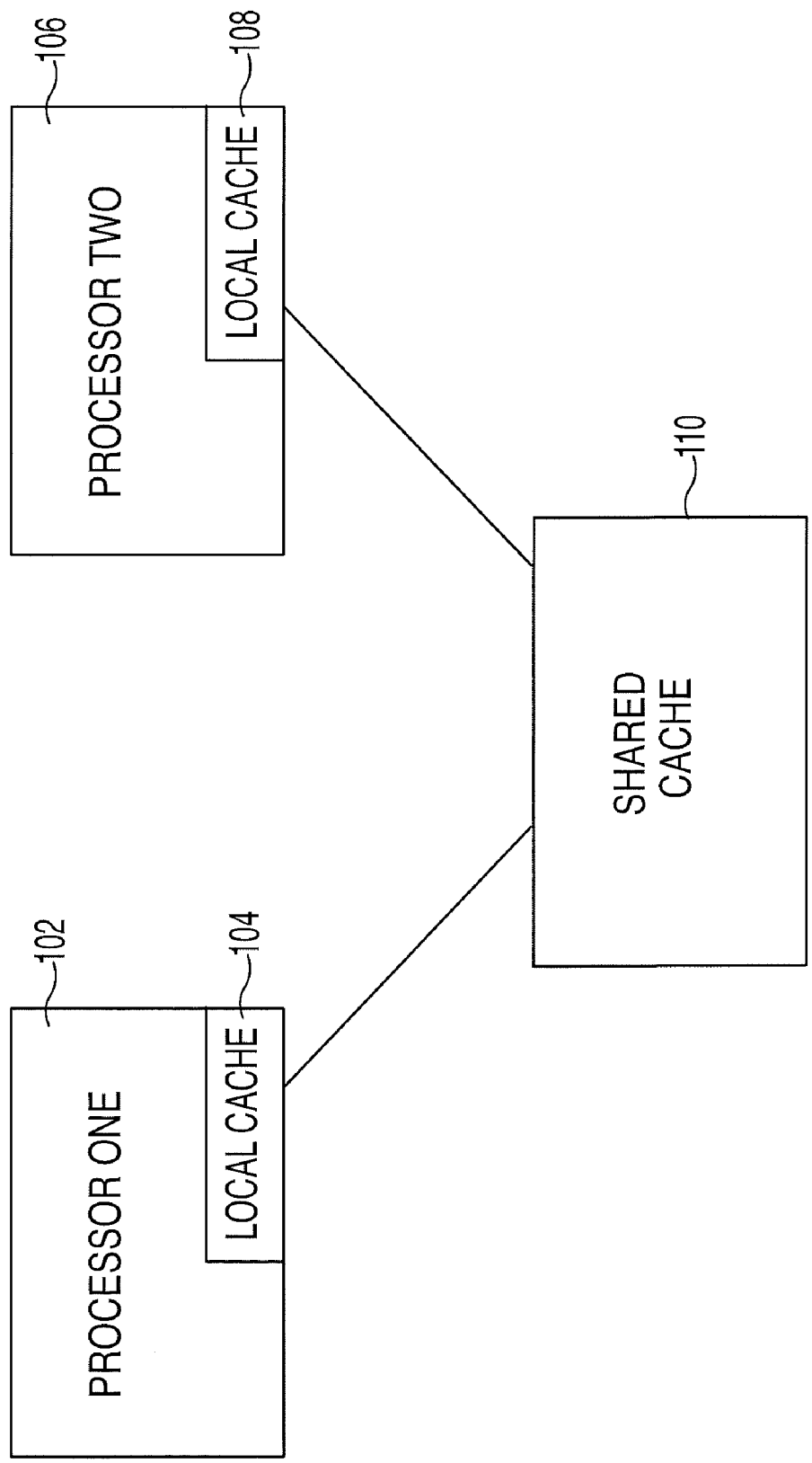
FIG. 1 is a block diagram of a multi-processor, shared data environment that may be implemented by an exemplary embodiment of the present invention.

An exemplary embodiment of the present invention allows for the detection of a potential deadlock situation and then the setting of the processor into a temporary transition mode of operation (referred to herein as "enhanced slow mode" or "ESM") where it will no longer try to hold a line exclusive for its store instruction while executing such stores. Instead, the storage update is temporarily buffered until instruction completion. This new mode of operation is done for the execution of one instruction, and after its completion, the load store unit (LSU) will re-acquire the line exclusive and finish the actual storage update by reading out from the store buffer.

By doing this for one instruction only, it effectively serializes storage access and thus does not violate the strongly-ordered storage consistency rules that are required by certain computer architectures, like IBM's z/Architecture. In addition, the impact to effective performance is minimal because the occurrence of this type of deadlock is a relatively rare event in a multi-processor, shared storage environment.

Further, in an exemplary embodiment, the processor will prevent itself from entering the ESM mode of operation if an atomic instruction is being executed. An atomic instruction is one where the fetch and store update are considered to be one operation as defined by the architecture if they are to the same memory location. In this case, the processor is not allowed to fetch, execute, and store without having the line exclusive during the whole process. An example of such instruction is "compare and swap" in IBM's z/Architecture.

In microprocessors that implement a strongly-ordered consistent memory image, it is natural that when an instruction is executed, the processor will first acquire the line to be exclusive to itself before allowing its store execution and any subsequent instruction to be completed. It is also important to system performance that once a processor obtains exclusive right to a line, it keeps that status in its own L1 data cache because it is very likely that the processor will store to the line again. Similarly, the processor may often times also access that storage update through a normal fetch access, such architecture will also require the line to be held exclusive if that update is to be bypassed into the fetch before the master memory copy is updated in storage. The acquisition process of exclusive ownership before store update execution is usually referred to as a pipeline blocking write-allocate design.

However, the pipeline blocking write-allocate design can lead to potential deadlock if it has to implement an instruction that requires more than 1 operand, such as a storage-to-storage (SS) type instruction. In this case, if the processor is holding its destination operand exclusive in its cache, while it is also fetching one of its source operands from the next cache hierarchy due to a local cache miss, then holding the line exclusive can potentially create a resource deadlock for its upper cache hierarchy to return its source operand. A typical case is that processor "X" is holding a line "A" exclusive while fetching for line "B", while another processor "Y" is fetching line "A" while holding line "B" exclusive, and both processors are executing a SS type instruction using lines "A" and "B". If both processors continue to hold the lines exclusive and do not release the line until its instructions complete, they will deadlock each other.

FIG. 1 is a block diagram of a multi-processor, data sharing, system environment that may be implemented by exemplary embodiments of the present invention. FIG. 1 depicts two processors, processor one 102 and processor two 106. Processor one 102 includes a local cache 104 (also referred to herein as "level one cache" or "L1 cache") which tracks the ownership state (exclusive owner, read only, etc.) for each line of data in the local cache 104. Processor two 106 also includes a local cache 108 (also referred to herein as "L1 cache") which tracks the ownership state for each line of data in the local cache 108. Both processor one 102 and processor two 106 are in communication with a shared cache 110 (also referred to as a storage controller or SC) that tracks which processor, if any, currently has exclusive ownership of each line of data in the shared cache 110 which is a superset of the data in the local caches 104 108. The communication between local caches and SC may include more cache hierarchies like level-2 caches not shown in this diagram. The shared cache 110 includes hardware mechanisms to revoke and to give exclusive ownership status of lines in the shared cache 110 to a requesting processor 102 106, and vice versa. The shared cache 110 also tracks if any processors might have obtained read-only ownerships to cache lines. The shared cache 110 has to request invalidation of read-only copies before a processor can be given an exclusive access to the same line.

Figure 2:
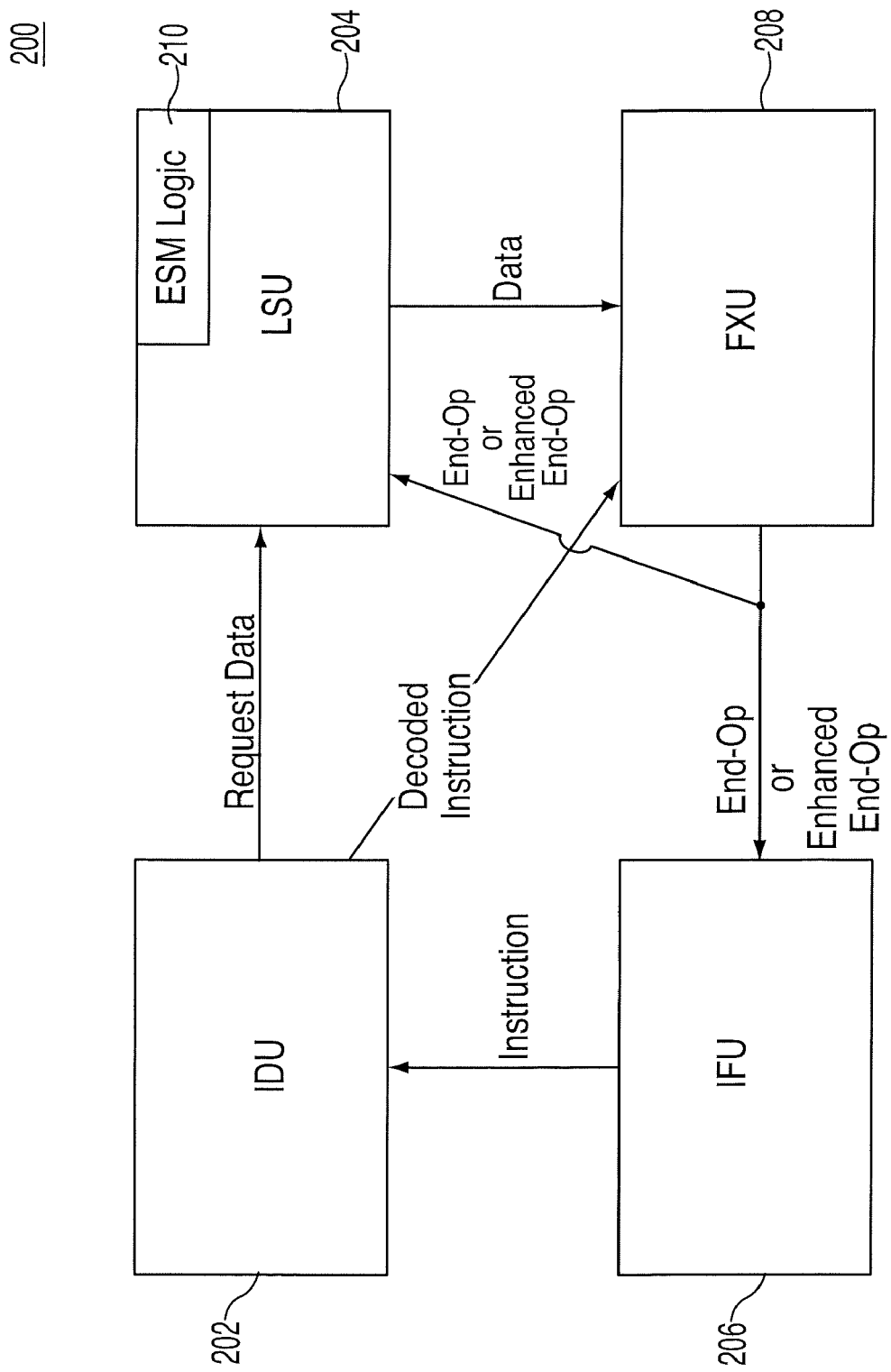
FIG. 2 is a block diagram of a processor that may be implemented by an exemplary embodiment of the present invention.

FIG. 2 is block diagram of a processor 200 (e.g., a microprocessor, a pipelined processor) that may be implemented by an exemplary embodiment of the present invention. The functions performed by the blocks depicted in FIG. 2 may be located in processor one 102 and/or processor two 106. In addition, the functions may be implemented by hardware and/or software instructions including firmware or microcode. FIG. 2 includes an instruction decode unit (IDU) 202, a load/store unit (LSU) 204 which contains the local cache 104/108, an instruction fetch unit (IFU) 206, and a fixed-point unit (FXU) 208. Other units or connections not required to show a typical fixed-point instruction are not shown. The IFU 206 fetches instructions and forwards the instructions to the IDU 202. The IDU 202 decodes instructions and dispatches requests for data associated with one or more dispatched instructions to the LSU 204. The IDU 202 also dispatches one or more of the decoded instructions to the FXU 208. The LSU 204 responds to the data requests, and provides the data to the FXU 208, using the ESM, if required, to avoid a deadlock. The LSU 204 includes a directory that tracks the ownership state (exclusive ownership, read only, etc.) for each line of data in the cache local to the processor. The LSU 204 also includes a store queue that handles storage updates during instruction execution. The store queue will maintain a line exclusive while a store operation is still pending until the store updates are committed to local cache. When the FXU 208 has completed executing the instruction it transmits an end operation (end-op) notification to the IFU 206 and LSU 204.

Figure 3:
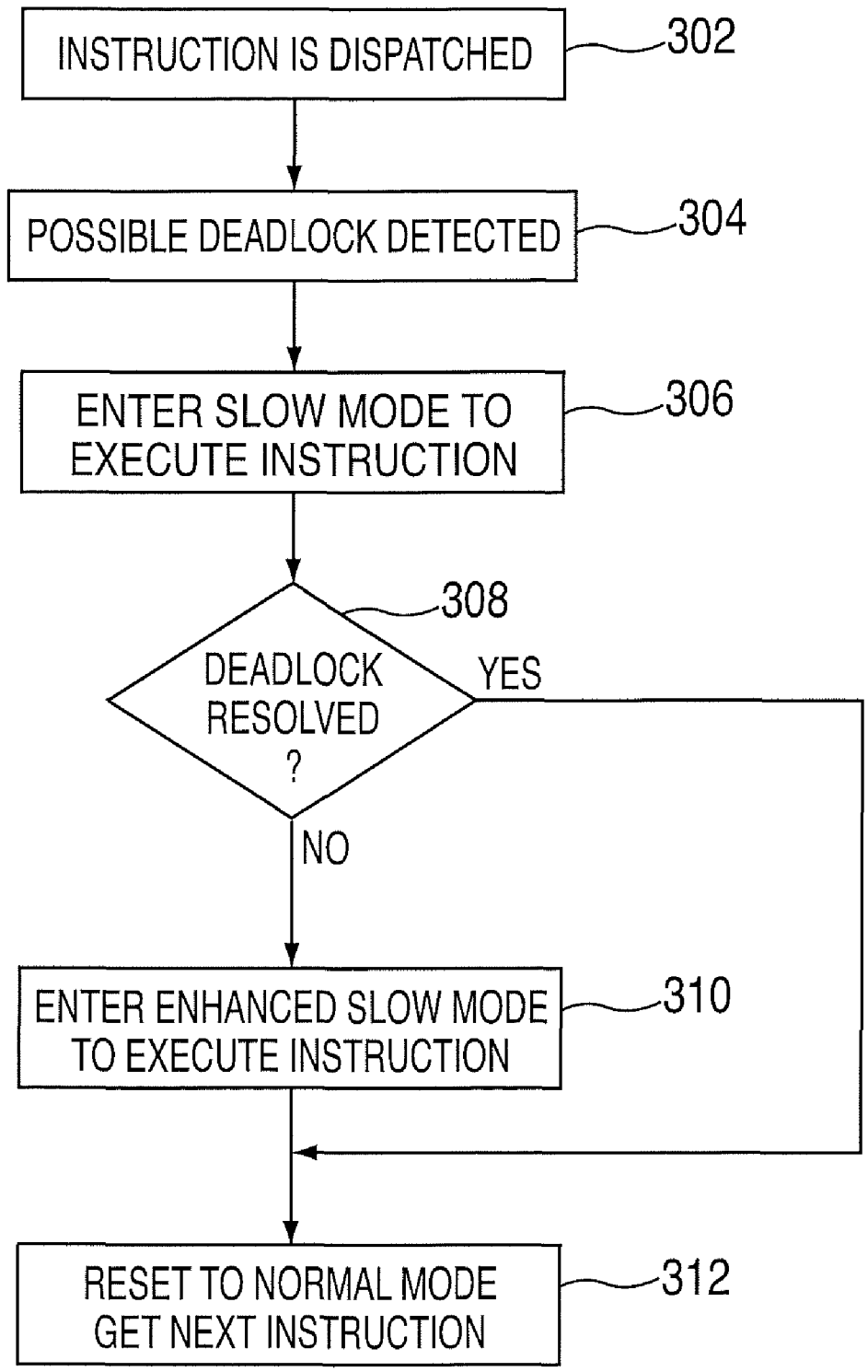
FIG. 3 depicts a process for detecting and avoiding a deadlock in accordance with an exemplary embodiment of the present invention.

FIG. 3 depicts an exemplary process for avoiding a deadlock in accordance with an exemplary embodiment of the present invention. At block 302, an instruction that requires a data store is first fetched by the IFU 206 and then dispatched by IDU 202. As described previously, the LSU 204 receives a request for the data associated with the instruction from IDU 202. At block 302, the processor is running in normal mode (e.g., fast mode) where instructions are fetched, decoded, dispatched and executed in pipelined mode. These operations can be running in-order or out-of-order. At block 304 a possible deadlock is detected. In an exemplary embodiment, a possible deadlock is detected when a demand miss is pending in the LSU 204 and when the number of times that the store queue in LSU 204 has rejected an exclusive ownership release (exclusive XI) to the shared cache 110 reaches a threshold number (e.g., sixteen, ten or any installation defined threshold). If there is no forward progress, i.e. no instructions can be executed or completed, while the threshold is reached, a deadlock is possibly occurring. Note that the exclusive XI being rejected may or may not be the same line depending on how many lines are currently held in the store queue for store execution.

At block 306, the FXU 208 is notified by the LSU 204 about the deadlock potential and the FXU 208 nullifies current instructions processing by flushing the pipeline. At block 306, the processor enters slow mode to retry the execution of the instruction in single instruction mode without any execution overlap or prefetching. This mode is commonly known to those skilled in the art. During slow mode, the IFU 206 fetches and IDU 202 decodes only one instruction to the IDU 202 until the end-op from the FXU 208 is received at the IFU 206. Typically, slow mode is utilized to detect exceptions in proper architectural order, but in this case, it is used specifically to ensure that only one instruction is being processed so to prevent overlapped instructions from creating deadlock to themselves. Similar to normal mode, exclusive ownership is requested for the data to be stored by the instruction. If instruction successfully completes with no deadlock, at block 312, the slow mode state will be reset, and normal instruction processing resumes. If the deadlock is still being detected, as determined at block 308, then block 310 is performed. At block 310, the FXU 208 is notified, by the LSU 204, that the deadlock still exists and the instruction is nullified by the FXU 208. The processor then enters the enhanced slow mode (ESM) by flushing the pipeline and setting the ESM state. In an exemplary embodiment, the processing depicted in FIG. 3 is performed by hardware and/or software including firmware or microcode located on the processor 200 depicted in FIG. 2.

During ESM, the IFU 206 and IDU 202 work similarly as in slow mode. The LSU, however, does not request exclusive ownership of cache lines to be stored until the operation(s) specified by the instruction have been completed. Instead, the LSU 204 requests only usage of cache lines (i.e. read-only ownership, as opposed an exclusive ownership) even if those lines are needed for the corresponding storage updates as needed for the instruction. The results of the instruction will be stored in its temporary store data buffer. These store results will only be drained into the cache hierarchy after instruction completion and that the store queue logic has acquired exclusive ownership to each cache line to be updated. The IFU 206 does not fetch the next instruction when receiving the end-op from the FXU 208. Instead, the IFU 206 waits until the FXU 208 sends an enhanced end-op which indicates that the instruction is completed and that all store results have already been written into the cache hierarchy (e.g., based on signals from the LSU 204).

For typical store processing in a processor, the store address request (store pretest) will be done first by looking up line ownership in the local cache's (104/108) directory. If not owned exclusive, an exclusive ownership request will be sent to the shared cache 110. Then when exclusive ownership is obtained, the address will be written into the store queue, which manages the actual store data updates. Store data from execution units will be written into its temporary store data buffer during instruction execution. There is a duration of time between the store pretest and the store instruction completion. The store queue will be responsible for holding the line exclusive from pretest until stores are drained from its temporary data buffer, by rejecting any exclusive XI to a line is held exclusive and valid in its store queue.

In an exemplary embodiment of ESM, the LSU store-queue will not reject any exclusive XI to those lines to be stored to for this instruction. This can be done by either turning off its "XI reject valid" bit, or by turning off its copy of the exclusive ownership bit during store pretest. Although not absolutely necessary, a preferred implementation also includes having any miss on a pretest fetches only read-usage from shared cache 110. By fetching only a read-usage, it helps remove another possible ping-pong of cache lines with another processor that contributes to the original deadlock. In any case, during ESM the store-queue will not reject any XI to these target lines even if any target cache line miss returns exclusive and/or the pretest gets a hit as exclusive in the local cache's (104,108) directory. Since no lines are held exclusive in the store-queue for the current instruction, no XI reject will be possible, and thus no multiprocessor deadlock is possible during this phase of ESM. Note that in ESM, old and completed stores from prior instructions will still reject XI for a transient time period. Since these stores are completed, and thus do not depend on any operand access, they will eventually be drained into the cache hierarchy and retire, and will not cause any deadlock.

After all fetches and pretests are completed and processed, the instruction (one and only one) will end-op. After end-op and checkpoint, the LSU 204 will start its stores "draining" operations. The LSU store-queue will re-fetch its required lines exclusive by recycling the absolute address from one of its pending entries in the store queue through the LSU pipe and directory. An exclusive fetch request will be sent to the shared cache 110 if the line is not already exclusive. After a line is returned exclusive from the shared cache 110 (or is already exclusive in local cache 104/108), stores for that line will then be drained. The LSU store-queue will march down its entries used for the ESM instruction one at a time, and do a "re-fetch drain" sequence for each. If, instead, the store queue tries to re-fetch all lines exclusive without draining the stores per line, a deadlock can still possibly occur since the store queue may be holding a line exclusive while fetching another line from the shared cache 110. When the store-queue is done fetching the last line, and/or drained all pending stores, it sends a store-queue-done to the FXU 208 to indicate it is safe to exit ESM and restart the instruction stream in normal mode.

Figure 4:
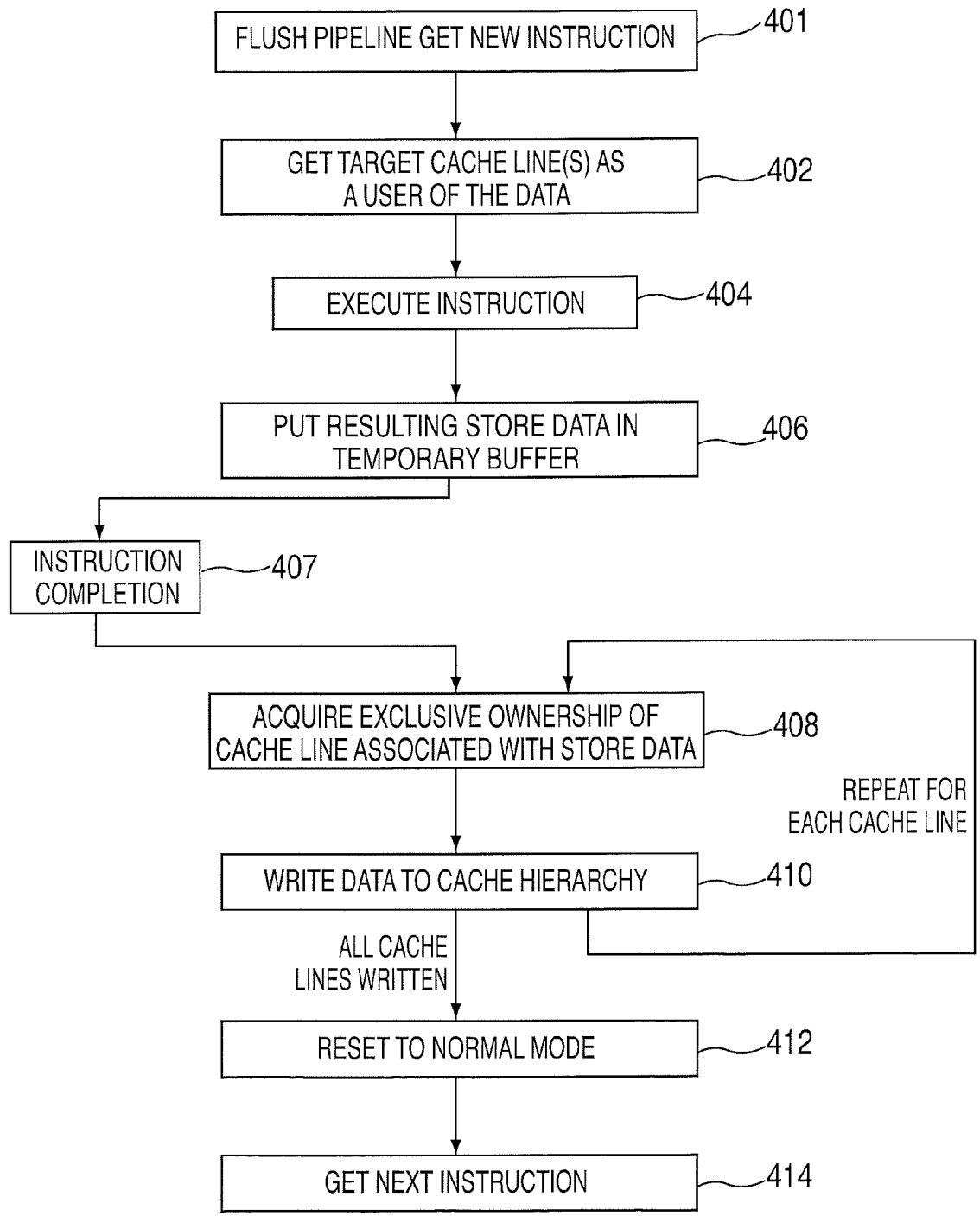
FIG. 4 depicts a process for operating in enhanced slow mode in accordance with an exemplary embodiment of the present invention.

FIG. 4 depicts a process for operating in ESM in accordance with an exemplary embodiment of the present invention. In an exemplary embodiment, the processing depicted in FIG. 4 is performed by hardware and or software like firmware or microcode located on the processor 200 depicted in FIG. 2. At block 401, the processor pipeline is flushed and the ESM state is set. At block 402, the cache lines associated with store data generated by an instruction are retrieved and added to the local cache as a user (with a status of read only). At block 404, the instruction is executed, and at block 406 the store data resulting from the execution of the instruction is stored in a temporary buffer (store queue data buffer). Once the instruction is completed at box 407 the store queue logic in LSU 204 can start the store drain process. At block 408, each cache line associated with the store data in the temporary buffer will be confirmed to be in the local cache with a status of exclusive ownership. If the cache line is not already exclusive, a fetch exclusive request will be sent to shared cache 110.

At block 410, the data from the temporary buffer is written to the local cache and propagated through the cache hierarchy. The store queue will repeat this process one cache line at a time until all stores are drained. At block 412, the processor is reset to normal mode, and at block 414 the next instruction is fetched.

In an exemplary embodiment, a write-through scheme is utilized and the updated information is written both to the local cache 104, 108 and to other higher levels of cache (e.g., L2 and L3) in the memory system. This allows all of the processors to see the same information. In an alternate exemplary embodiment, a write-back scheme is utilized and the information is written only to the local cache 104, 108. In this scheme, the modified information is only written to the higher levels of cache (e.g., L2 and L3) when the cache line is being replaced in the local cache 104, 108. The write-through or write-back scheme can varies depending on cache hierarchy and topology.

Figure 5:
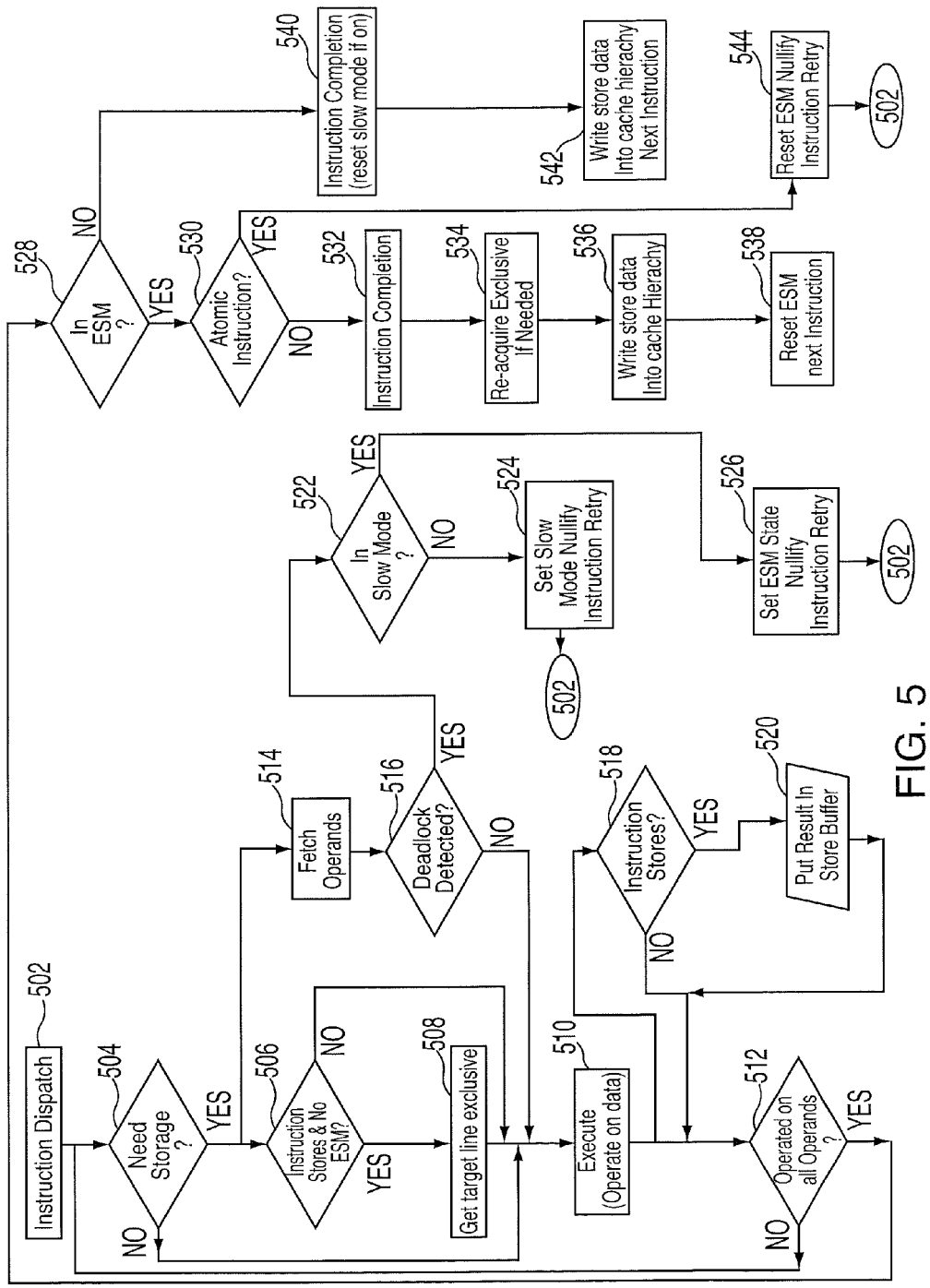
FIG. 5 depicts a process for detecting and avoiding a deadlock in accordance with an exemplary embodiment of the present invention.

FIG. 5 depicts a process for detecting and avoiding a deadlock in accordance with an exemplary embodiment of the present invention. An in-order single-scalar processor pipeline is described, but application to an out-of-order and/or superscalar processor can be derived by those skilled in the art. In an exemplary embodiment, the processing depicted in FIG. 5 is performed by hardware and/or software like firmware or microcode located on the processor 200 depicted in FIG. 2. At block 502, an instruction is dispatched by the IDU 202. If the instruction requires storage, as determined at block 504, then blocks 514 and 506 are performed by the LSU 204. At block 514, the operands are fetched. If the instruction stores data and the processor is not in ESM, as determined at block 506, then block 508 is performed to get the target line(s) into the local cache with a status of exclusive ownership. If a deadlock is detected by the LSU 204, as determined at block 516, processing continues at block 522. In an exemplary embodiment, a deadlock is detected if a pre-selected number of exclusive XI's are rejected (e.g., 12, 16, etc.) while requests for local cache misses are outstanding. At block 522 it is determined if the processor is already in slow mode. If it is not then block 524 is performed to put the processor into slow mode, by first flushing the processor pipeline and nullifying (e.g., abort) all current non-completed instructions and then to retry execution of the instruction with processing continuing at block 502.

If the processor is already in slow mode as determined at block 522, then block 526 is performed to put the processor into ESM, by first flushing the processor pipeline and nullifying the instruction and then to retry execution of the instruction with processing continuing at block 502.

If a deadlock is not detected at block 516, then block 510 is performed to execute the instruction (i.e., to operate on the data). If the instruction stores data, as determined at block 518, then the results are put into a temporary buffer (store queue data buffer) at block 520. If all of the operands have not been operated on, as determined at block 512, then processing continues at block 504. Otherwise, processing continues at block 528 where it is determined if the processor is in ESM. If the processor is in ESM, then block 530 is performed to determine if the instruction is an atomic instruction. If the instruction is an atomic instruction then block 544 is performed to put the process back into normal mode (by resetting ESM state), to nullify the instruction and then to retry execution of the instruction, with processing continuing at block 502. If the instruction is not an atomic instruction, then block 532 is performed and execution of the instruction is completed. At block 534, exclusive ownership of target lines are acquired (if needed) and at block 536, the data from the store buffer is written to the target cache lines and into the rest of cache hierarchy if in store-through mode. The exclusive acquisition and store update to target lines are done one line at a time to avoid further deadlocks. While all pending stores are drained, then at block 538, the process is reset to normal mode and the next instruction is fetched and dispatched in 502.

If the processor is not in ESM, as determined at block 528, then processing continues at block 540 and the instruction is completed. In addition, the processor is reset to normal mode (if required). At block 542, the data from the temporary buffer (store queue data buffer) is written to the target lines and into the cache hierarchy, and the next instruction is fetched and dispatched in 502.

Technical effects and benefits include the ability to detect and avoid a potential deadlock situation in a multiprocessor environment.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

IBM® is a registered trademark of International Business Machines Corporation, Armonk, N.Y., U.S.A. Other names used herein may be registered trademarks, trademarks or product names of International Business Machines Corporation or other companies.

The invention claimed is:

1. A processor in a multi-processor shared data environment having a cache memory structure involving various ownership states as to a cache line, which state includes a read-only or shared state and an exclusive state for holding the line exclusively, with such processor comprising:

a local cache adapted for communication with one or more shared higher level caches for sourcing cache lines;
a store queue having a temporary buffer with capability to reject exclusive cross-interrogates (XI) while an interrogated cache line is owned exclusive and is to be stored; and
a mechanism for performing a method comprising:
setting the processor into a slow mode to fetch, decode and execute a single instruction at a time;
receiving a current instruction that includes a data store of data to one or more target lines;
executing the current instruction, the executing including storing the data into the temporary buffer;
preventing the store queue from rejecting an exclusive XI corresponding to the target lines of the current instruction; and
acquiring each of the target lines with a status of exclusive ownership and writing contents from the temporary buffer to each target line after instruction completion.

2. The processor of claim 1 wherein the preventing the store queue from rejecting an exclusive XI is performed by blocking a XI reject valid bit for target lines associated with the data store even if the processor already has line exclusive in response to receiving the current instruction.

3. The processor of claim 2 wherein the preventing is further accomplished by only acquiring target lines of read-only or shared status associated with the data store from the local cache, and marking it as read-only status in the store queue in response to receiving the instruction.

4. The processor of claim 1 wherein the processor is set into the slow mode in response to detecting a deadlock on a previous attempt in normal mode to execute instructions by requesting each target line with a status of exclusive ownership.

5. The processor of claim 1 wherein when the instruction is an atomic Instruction. Each of the target lines is acquired with a status of exclusive ownership in response to receiving the instruction and the acquiring each of the target lines with a status of exclusive ownership after the execution has completed is not performed.

6. The processor of claim 1 wherein the method further comprises resetting the processor into a fast or normal mode to execute multiple instructions at a time.

7. The processor of claim 1 wherein the processor is a pipelined processor.

8. The processor of claim 7 wherein the pipelined processor is also out of order.

9. The processor of claim 1 wherein the writing to the target line is performed using a write-through scheme.

10. The processor of claim 1 wherein the writing is performed using a write-back scheme.

11. A method for avoiding deadlocks when performing storage updates in a multi-processor environment, the method comprising:
setting a processor into a slow mode to fetch, decode and execute a single instruction at a time;
receiving a current instruction that includes a data store of data to one or more target lines;
executing the current instruction, the executing including storing the data into a temporary buffer;
preventing the store queue from rejecting an exclusive XI corresponding to the target lines of the current instruction; and
acquiring each of the target lines with a status of exclusive ownership and writing contents from the temporary buffer to each target line after instruction completion.

12. The method of claim 11 wherein the processor is set into the slow mode in response to detecting a deadlock on a previous attempt in normal mode to execute instructions by requesting each target line with a status of exclusive ownership.

13. The method of claim 11 wherein when the instruction is an atomic instruction, each of the target lines is acquired with a status of exclusive ownership in response to receiving the instruction and the acquiring each of the target lines with a status of exclusive ownership after the execution has completed is not performed.

14. The method of claim 11 wherein the method further comprises resetting the processor into a fast or normal mode to execute multiple instructions at a time.

15. The method of claim 11 wherein the processor is a pipelined processor.

16. The method of claim 15 wherein the pipelined processor is also out of order.

17. A processor in a multi-processor, shared data environment, the processor comprising:
a local cache adapted for communication with one or more shared higher level caches for sourcing cache lines; and
a mechanism for performing a method comprising:
receiving an instruction that includes a data store;
setting the processor to a fast mode where multiple instructions are executed in parallel and a target cache line associated with the data store is acquired from the local cache with a status of exclusive ownership prior to execution of the instruction;
initiating execution of the instruction in the fast mode;
in response to detecting a possible deadlock during the execution in fast mode:
aborting execution of the instruction in the fast mode;
setting the processor to a slow mode where a single instruction at a time is executed and the target cache line is acquired from the local cache with a status of exclusive ownership prior to execution of the instruction; and
initiating execution of the instruction in the slow mode; and
in response to detecting a possible deadlock during the execution in slow mode:
aborting execution of the instruction in the slow mode;
setting the processor to an enhanced slow mode where a single instruction at a time is executed and the target cache line is acquired from the local cache with a status of read only prior to execution of the instruction and in a status of exclusive ownership after execution of the instruction has completed; and
initiating execution of the instruction in the enhanced slow mode.

18. The processor of claim 17 wherein the method further comprises resetting the processor into a fast mode after the instruction has completed in the enhanced slow mode.

19. The processor of claim 17 wherein a possible deadlock is detected when a threshold number of exclusive XI rejects have been performed without an instruction being completed.

20. The processor of claim 19 wherein a possible deadlock is prevented by qualifying the exclusive XI rejects with current local cache misses while acquiring one or more cache lines from shared cache for either read-only or exclusive status.

* * * * *